(12) United States Patent
Yamashita

(10) Patent No.: US 6,349,101 B1
(45) Date of Patent: Feb. 19, 2002

(54) CELL BUFFER CIRCUIT FOR AN ATM CELLS TO SDH-BASED DATA CONVERSION SYSTEM

(75) Inventor: Toshiya Yamashita, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/196,142

(22) Filed: Nov. 20, 1998

(30) Foreign Application Priority Data

Nov. 25, 1997 (JP) .............................................. 9-322881

(51) Int. Cl.[7] .......................... H04L 12/28; H04L 12/54
(52) U.S. Cl. ...................... 370/412; 370/395; 370/413; 370/429
(58) Field of Search ................................ 370/230, 235, 370/368, 395, 412, 413, 428, 429, 236, 414, 416, 539

(56) References Cited

U.S. PATENT DOCUMENTS 5,249,178 A * 9/1993 Kurano et al. ............... 370/392
5,515,386 A * 5/1996 Takizawa et al. ........... 371/37.1
5,541,926 A * 7/1996 Saito et al. .................. 370/474
5,946,312 A * 8/1999 Suzuki ........................ 370/395
6,259,698 B1 * 7/2001 Shin et al. ................... 370/395

FOREIGN PATENT DOCUMENTS

JP          9-74416          3/1997

* cited by examiner

*Primary Examiner*—Hassan Kizou
*Assistant Examiner*—Minh Dia A
(74) *Attorney, Agent, or Firm*—Rabin & Berdo, P.C.

(57) ABSTRACT

A cell buffer circuit included in a system for converting ATM (Asynchronous Transfer Mode) cells to SDH (Synchronous Digital Hierarchy)-based data is disclosed. The cell buffer circuit includes a series connection of a first and a second shift register to which input cell data are sequentially input. In response to a back pressure signal output from a FIFO (First-In First-Out) memory, the output of cell data is interrupted. When the back pressure signal disappears, a selector selects and outputs either one of the cell data stored in the shift registers 11 and 12 having been interrupted first. When invalid data are input, the selector is prevented from selecting the invalid data, or a FIFO write control signal generator is caused to output a FIFO write control signal disabling the writing of cell data in the FIFO memory.

5 Claims, 4 Drawing Sheets

NO DELAY | DELAY BY 1 CELL | DELAY BY 2 CELLS | DELAY BY 1 CELL | NO DELAY

CELL BUFFER CIRCUIT FOR AN ATM CELLS TO SDH-BASED DATA CONVERSION SYSTEM

BACKGROUND OF THE INVENTION

1. Field of the Invention

The present invention relates to ATM (Asynchronous Transfer Mode) data communication and, more particularly, to a cell buffer circuit for allowing ATM cells to be dealt with by an SDH (Synchronous Digital Hierarchy)-based interface.

2. Description of the Background Art

A conventional system for converting ATM cell data to SDH-based data includes a cell length converting and valid cell detecting section. This section removes an additional byte from input fifty-four byte ATM cell data and feed only the ATM cell data of valid cells to a FIFO (First-In First Out) memory. Such data are read out of the FIFO memory and mapped in the ATM cell area of an SDH frame generator. The data output from the SDH frame generator are converted to a serial signal and then output.

The problem with an SDH frame assigned to the SDH frame generator is that an overhead (OH) byte area makes the rate at which the cell data are read out of the FIFO memory lower than the rate at which they are written to the memory. As a result, when more than a preselected number of valid cells are continuously written to the FIFO memory, the memory overflows. To prevent the FIFO memory from overflowing, the memory delivers a back pressure signal to the cell length converting and valid cell detecting section when it is about to overflow, thereby inhibiting the above section from writing cell data in the memory. The back pressure signal, however, brings about another problem that it interrupts the delivery of valid cells from the cell length converting and valid cell detecting signal to the FIFO memory, causing valid cells to be lost.

SUMMARY OF THE INVENTION

It is therefore an object of the present invention to provide a cell buffer circuit capable of preventing valid cell data from being lost even when stopping the delivery of cell data to a FIFO memory in response to a back pressure signal.

In accordance with the present invention, a cell buffer circuit includes a cell data shifting section having a series connection of shift registers for sequentially shifting input cell data having a preselected length. The shift registers each delays the input cell data by an amount corresponding to the preselected length. A selector selects either the input cell data or cell data output from any one of the shift registers on a cell data basis. A controller controls the selector such that the selector stops, on receiving a back pressure signal when selecting the input cell data, delivery of cell data once and selects cell data output from the first shift register thereafter. The controller causes the selector to stop, on receiving the back pressure signal when selecting cell data output from the nth shift register, the delivery of cell data once and select cell data output from the n+1th shift register thereafter. Further, the controller causes the selector to stop, if the input cell data being selected by the selector are invalid, outputting the invalid cell data. In addition, the controller causes the selector to select, on receiving invalid input cell data when selecting the cell data output from the nth shift register, cell data output from the n−1th shift register after the invalid input cell data have been transferred to the nth shift register.

Also, in accordance with the present invention, a cell buffer circuit includes a cell data shifting section having a shift register for shifting input cell data having a preselected length to thereby delay the input cell data by an amount corresponding to the preselected length. A selector selects either the input cell data or cell data output from the shift register on a cell data basis. A controller controls the selector such that the selector stops, on receiving a back pressure signal when selecting the input cell data, the delivery of cell data once and selects cell data output from the shift register thereafter, such that the selector stops, if the input cell data being selected by the selector are invalid, outputting the invalid cell data, and such that the selector selects, on receiving invalid input cell data when selecting the cell data output from the shift register, input cell data after the invalid input cell data have been transferred to the shift register.

Further, in accordance with the present invention, a cell buffer circuit includes a cell data shifting section having a series connection of shift registers for sequentially shifting input cell data having a preselected length. The shift registers each delays the input cell data by an amount corresponding to the preselected length. A selector control signal generator includes a counter whose initial count is "0". The selector control signal generator increments, on receiving a back pressure signal, the count at the head of the next input cell data or decrements, if the count is n when invalid input cell data are input, the count at the head of the nth input cell data as counted from said invalid input cell data. In any case, the selector control signal generator outputs a selector control signal representative of the current count of the counter. A selector selects the input cell data when the selector control signal is representative of the count "0" or selects, when the selector control signal is representative of a count n, cell data output from the nth shift register. A write control signal generator generates a write control signal for inhibiting the writing of one cell of data output from the selector on receiving invalid input cell data when the count represented by the selector control signal is incremented or when the count is "0".

BRIEF DESCRIPTION OF THE DRAWINGS

The objects and features of the present invention will become more apparent from the consideration of the following detailed description taken in conjunction with the accompanying drawings in which:

FIGS. 4A–4F form a timing chart demonstrating a specific operation of the illustrative embodiment.

DESCRIPTION OF THE PREFERRED EMBODIMENT

To better understand the present invention, brief reference will be made to a conventional system for converting ATM cell data to SDH-based data, shown in FIG. 1. As shown, ATM cell data 300 having a length of fifty-four bytes are input from the outside of the system to a cell length conversion and valid cell detection 30. The cell length conversion 30 removes an additional byte from the cell data 300 and thereby converts the data length to fifty-three bytes. Then, the valid cell detection 30 determines whether or not the cell is valid and writes, if the cell is valid, the cell in a FIFO memory 31.

Figure 2:
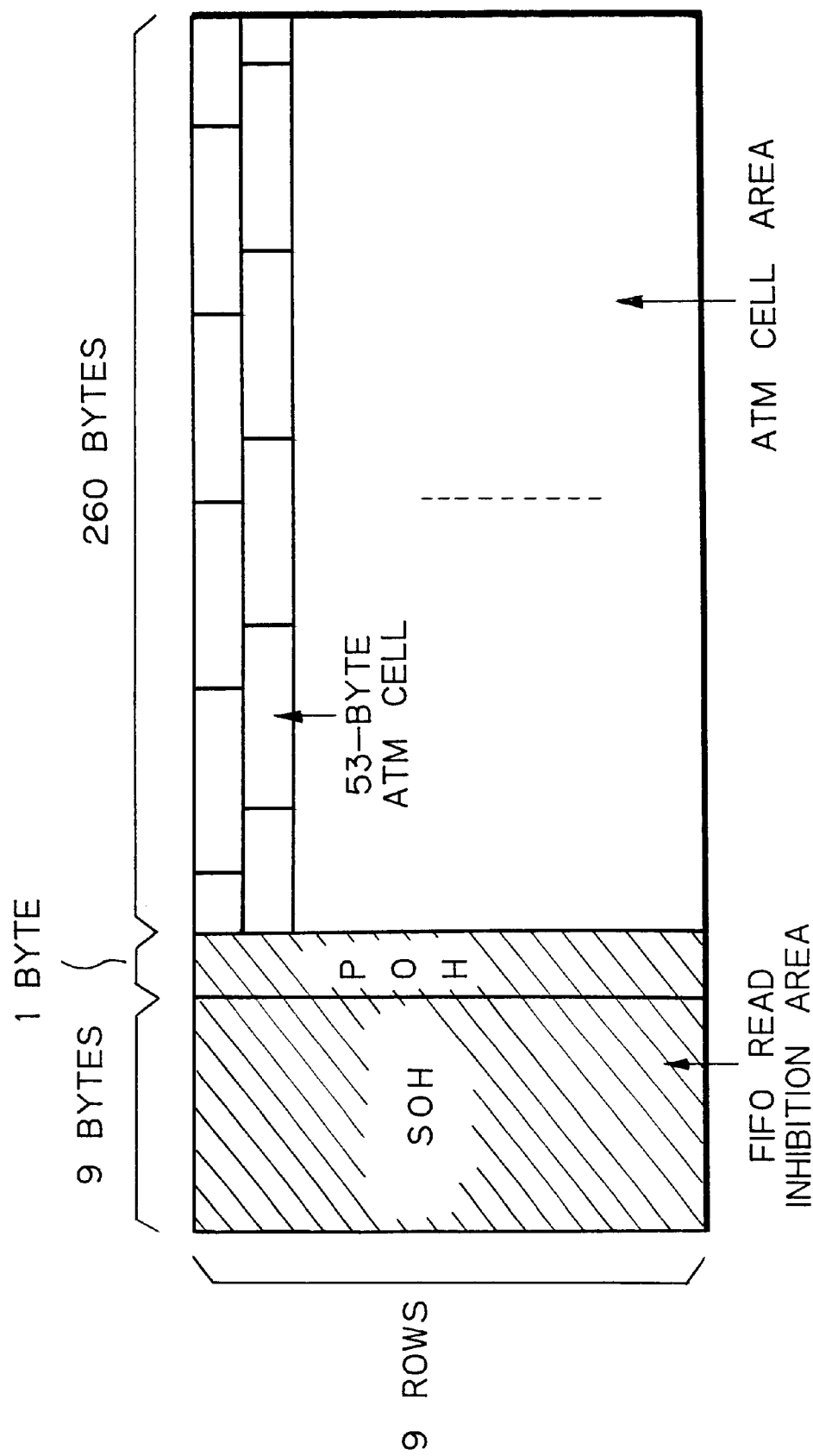
FIG. 2 shows a specific format on an SDH frame.

The valid cells or data written to the FIFO memory 31 are read out at a preselected timing and input to an SDH generation 32. The SDH, frame generation 32 maps the input data into the ATM cell area of an SDH frame. FIG. 2 shows a specific configuration of the SDH frame. A parallel-to-serial conversion 33 converts the data of the SDH frame output from the SDH frame generation 32 to a serial signal and delivers the serial signal in the form of an SDH-based output data 304.

The problem with the SDH frame of FIG. 2 is that an OH byte area makes the rate at which the cell data are read out of the FIFO memory 31 lower than the rate at which the cell data are read out of the FIFO memory 31 lower than the more than a preselected number of valid cells are continuously written to the FIFO memory 31, the memory 31 overflows. To prevent the FIFO memory 31 from overflowing, the FIFO memory 31 delivers a back pressure signal 303 to cell length conversion and valid cell detection 30 when it is about to overflow, thereby inhibiting the block 30 for writing cell data in the memory 31. The back pressure signal 303, however, brings about another problem in that it interrupts the delivery of valid cells from the cell length conversion and valid cell detection 30 to the FIFO memory 31, causing valid cells to be lost.

Figure 3:
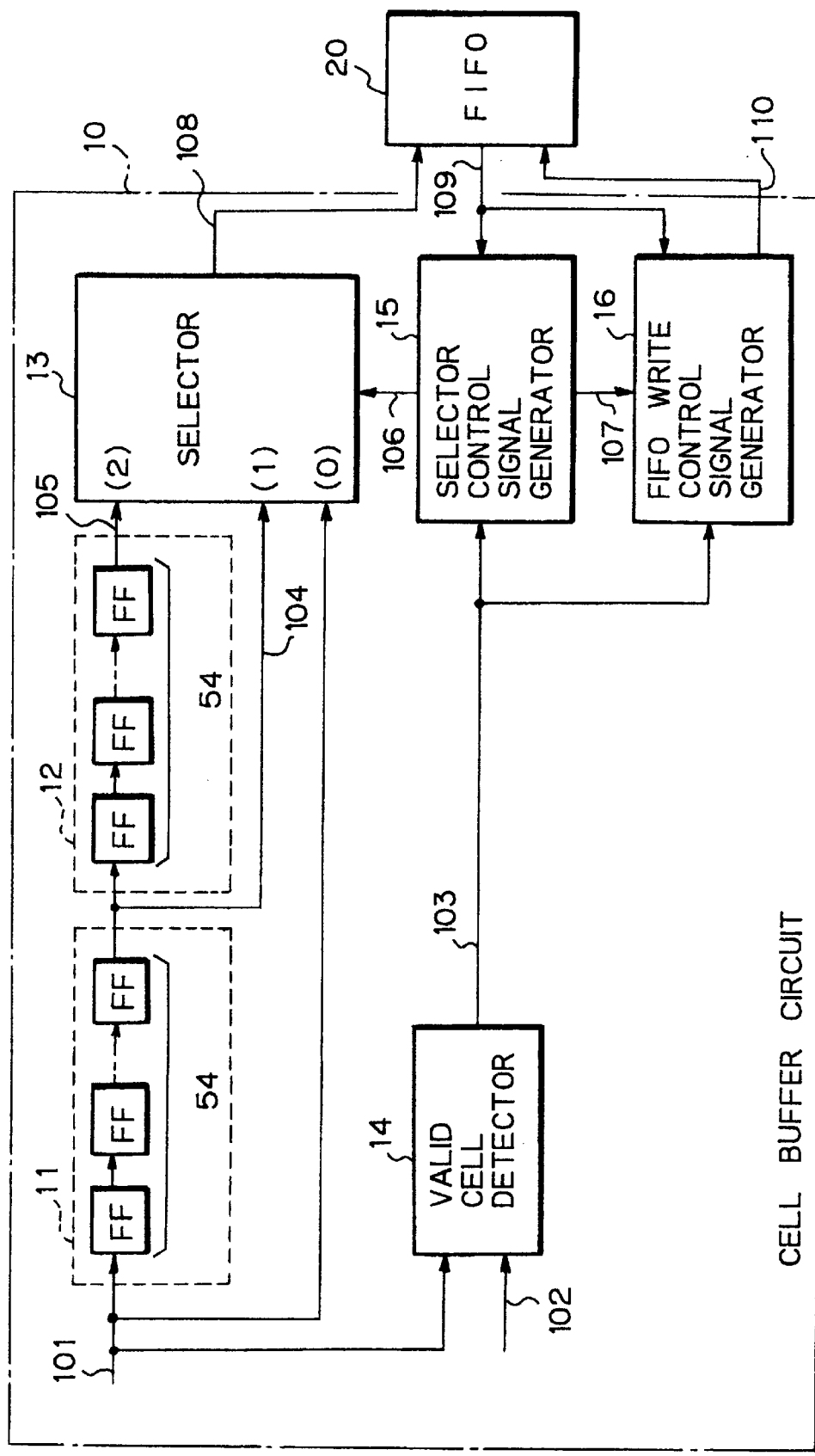
FIG. 3 is a block diagram schematically showing a cell buffer circuit embodying the present invention.

Referring to FIG. 3, a cell buffer circuit embodying the present invention is shown and generally designated by the reference numeral 10. As shown, the cell buffer circuit 10 is connected to a FIFO memory 20 and includes a series connection of shift registers 11 and 12. Input ATM cell data 101 are sequentially routed through the shift registers 11 and 12. A selector 13 selects one of the input cell data 101, cell data 104 output from the shift register 11, and cell data 105 output from the shift register 12. The cell data 101, 104 or 105 selected by the selector 13 are input to the FIFO memory 20. When the FIFO memory 20 sends a back pressure signal 109 inhibiting the writing of cell data in the memory 20 to the cell buffer circuit 10, the circuit 10 stops writing cell data and discards, if the input cell data 101 are an invalid cell, the data of the invalid cell. This prevents the data of a valid cell from being lost even when the FIFO memory 20 inhibits further cell data from being written thereto.

Figure 1:
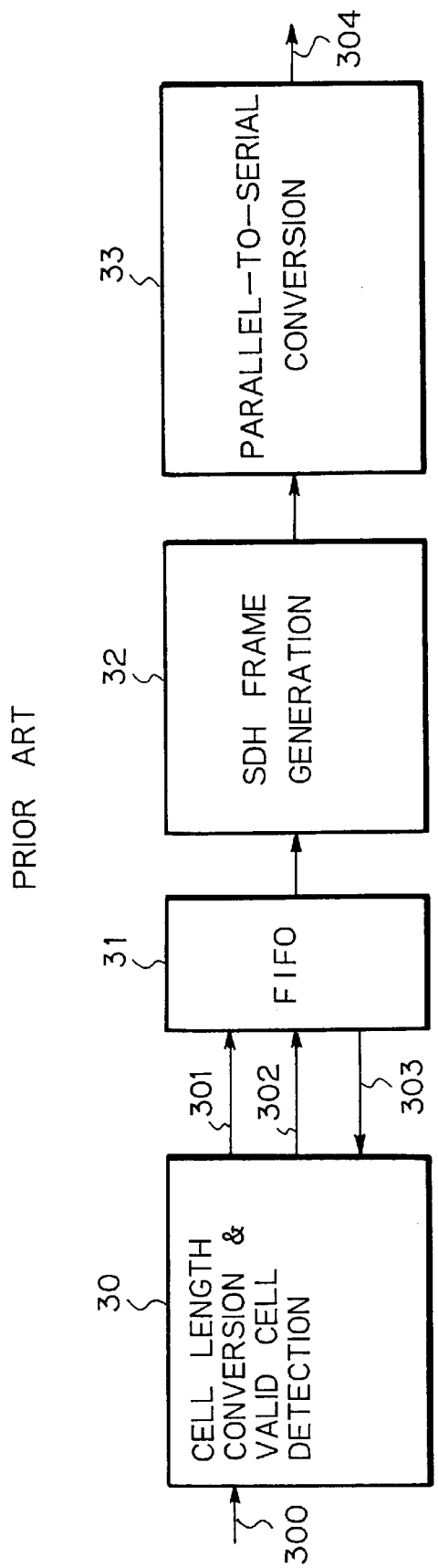
FIG. 1 is a block diagram schematically showing a conventional system for converting ATM cell data to SDH-based data.

It is to be noted that the cell buffer circuit 10 and FIFO memory 20 respectively correspond to the cell length conversion and valid cell detection 30 and FIFO memory 31 shown in FIG. 1.

Specifically, the ATM cell data 101 input to the cell buffer circuit 10 has a length of fifty-four bytes. The cell data 101 are input to the shift register 11, one input terminal (0) of the selector 13, and a valid cell detector 14. A cell head signal 102 indicative of the head of a cell is also input to the valid cell detector 14. The back pressure signal 109 output from the FIFO memory 20 is input to a selector control signal generator 15 and a FIFO write control signal generator 16.

The shift register 11 delays the input cell data 101 by fifty-four bytes. The shift register 11 is implemented by, e.g., a serial connection of flip-flops (FFs), as illustrated. The input cell data 101 are sequentially shifted from the input FF toward the output FF in accordance with a clock signal. The resulting cell data 104 delayed by fifty-four bytes are fed to the other shift register 12 and the input terminal (1) of the selector 13. The shift register 12 is identical in construction and operation with the shift register 11 and feeds delayed cell data 105 to the input terminal (2) of the selector 13. While the shift registers 11 and 12 of the illustrative embodiment each delays input cell data by fifty-four bytes, the crux is that the delay implemented by each of the shift registers 11 and 12 be equal to the byte length of the cell data.

The selector 13 is controlled by the selector control signal 106 output from the selector control signal generator 15. When the control signal 106 is representative of "0", the selector 13 selects the input cell data 104 appearing on its input terminal(0). When the control signal 106 is representative of "1", the selector 13 selects the cell data 104 fed from the shift register 11 to its input terminal (1). Further, when the control signal 106 is representative of (2), the selector 13 selects the cell data 105 fed from the shift register 12 to its input terminal (2). The cell data 101, 104 or 105 selected by the selector 13 are sent to the FIFO memory 20 as output cell data 108.

The valid cell detector 14 separates a particular bit from the input cell data 101 on the basis of the cell head signal 102 representative of the heads of the consecutive cell data 101. By referencing the particular bit, the detector 14 determines whether the input cell is a valid cell including information to be transmitted or an invalid cell not including such information. If the input cell is a valid cell, then the detector 14 generates a valid cell detection signal 103 and feeds it to the selector control signal generator 15 and FIFO write control signal generator 16.

A counter is built in the selector control signal generator 15 although not shown specifically. The selector control signal generator 15 increments or decrements the counter in accordance with the valid cell detection signal 103 and back pressure signal 109 received from the valid cell detector 14 and FIFO memory 20, respectively. The selector control signal 106 and another selector control signal 107 output from the selector control signal generator 15 each is representative of the count of the above counter. The control signals 106 and 107 are delivered to the selector 13 and FIFO write control signal generator 16, respectively.

Specifically, the selector control signal generator 15 sets "0" in its counter at the beginning of operation. The selector control signals 106 and 107 are therefore representative of "0" at the beginning of operation. Assume that the control signal generator 15 receives the valid cell detection signal 103 while receiving the back pressure signal 109. Then, the control signal generator 15 increments the counter at the head of the input cell and outputs the selector control signals 106 and 107 representative of the updated count of the counter. Also, assume that while the count of the counter is "1", the control signal generator 15 does not receive the valid cell detection signal 103, i.e., when an invalid cell is detected by the valid cell detector 14. Then, the control signal generator 15 decrements the counter at the head of the next input cell. Further if the control signal generator 15 does not receive the valid cell detection signal 103 while the count of the counter is "2", then it decrements the counter at the head of a cell after next. In any case, the selector control signals 106 and 107 are representative of the current content of the counter.

The FIFO write control signal generator 16 receives the valid cell detection signal 103, selector control signal 107 and back pressure signal 109 from the valid cell detector 14, selector control signal generator 15, and FIFO memory 20, respectively. This control signal generator 16 outputs, in accordance with the input signals 103, 107 and 109, a FIFO write control signal 110 selectively enabling or disabling the writing cell data in the FIFO memory 20. The FIFO write control signal 110 is sent from the control signal generator 16 to the FIFO memory 20.

Specifically, when the FIFO write control signal generator 16 receives the valid cell detection signal 103, it outputs the FIFO write control signal 110 enabling the writing cell data. However, when the control signal generator 16 receives the back pressure signal 109 and the selector control signal 107 representative of the increment of the counter, it generates the FIFO write control signal 110 disabling the writing of cell data. Further, when the control signal generator 16 does not receive the valid cell detection signal 103, it generates the FIFO write control signal disabling the writing of cell data. On receiving the selector control signal 107 representative of "1" or "2", the control signal generator 16 generates the FIFO write control signal 110 enabling the writing of cell data. It is to be noted that the FIFO write control signal 110 is provided with fifty-three bytes in order to remove one byte added within the apparatus.

The cell buffer circuit 10 shown in FIG. 3 may be implemented by an FPGA (Field Programmable Gate Array) or a PLD (Programmable Logic Device), if desired.

Reference will be made to FIGS. 4A–4F for describing a specific operation of the cell buffer circuit 10. FIG. 4A shows the cell head signal 102 which goes high at the heads of consecutive cells. FIG. 4B shows the input cell data 101; cells #1, #2, #3, ..., #n+2, #n+4 and #n+6 are assumed to be valid while cells #n+3, #n+5 and #n+7 are assumed to be invalid. FIG. 4C shows the back pressure signal 109 which goes high in the event of disabling the writing of cell data. Usually, the back pressure signal 109 is output when the FIFO memory 20 is about to overflow. FIG. 4D shows the selector control signal 106 or 107; numerals "0", "1" and "2" each is indicative of the content of the selector control signal 106 or 107. FIG. 4E shows the output cell data 108. FIG. 4F shows the FIFO write control signal 110 which goes high in the event of disabling the writing of cell data or goes low in the event of enabling it.

First, assume that the data of the cell #2 are input as the input cell data 101, and that the selector control signals 106 and 107 each was representative of "0" at the time when the cell #1 was input. Then, the valid cell detector 14 separates a particular bit from the data of the cell #2 on the basis of the cell head signal 102 appearing at the head of the cell #2. The valid cell detector 14 determines, based on the separated bit, whether or not the cell #2 is valid. Because the cell #2 is assumed to be valid, the detector 14 generates the valid cell detection signal 103 and feeds it to the selector control signal generator 15 and FIFO write control signal generator 16.

At the above stage, the selector control signal generator 15 has not received the back pressure signal 109 inhibiting the writing of cell data yet. Therefore, in response to the valid cell detection signal 103, the control signal generator 15 does not increment its counter, i.e., maintains the initial count "0". As a result, the selector control signals 106 and 107 representative of "0", as in the case with the cell #1, are fed from the control signal generator 15 to the selector 13 and FIFO write control signal generator 16, respectively.

In response to the selector control signal 106 representative of "0", the selector 13 selects the data of the cell #2 input to the input terminal (0) as the input cell data 101, and feeds the data to the FIFO memory 20 as the output cell data 108. In this manner, so long as the content of the counter included in the selector control signal generator 15 is "0", the data of valid cells are directly sent to the FIFO memory 20 via the selector 13 without any delay.

The FIFO write control signal generator 16 receives the valid cell detection signal 103 from the valid cell detector 14 as well as the selector control signal 107 representative of "0" from the selector control signal generator 15. In response, the signal generator 16 generates the FIFO write control signal 110 enabling the writing of cell data and sends it to the FIFO memory 20. While receiving this FIFO write control signal 110, the FIFO memory 20 takes in the data of the cell #2 output from the selector 13.

The valid cells following the cell #2 are also sequentially sent to the FIFO memory 20 via the selector 13 without any delay. However, the FIFO memory 20 would overflow if the valid cells were continuously written thereto over a preselected period of time. In light of this, the FIFO memory 20 sends the back pressure signal 109 to the cell buffer circuit 10 just before it overflows.

As shown in FIG. 4C, assume that the back pressure signal 109 is sent from the FIFO memory 20 to the selector control signal generator 15 and FIFO write control signal generator 16 during the receipt of the cell #4, and then the data of the cell #5 are input as the input cell data 101. Then, the valid cell detector 14 determines, based on the cell head signal 102, whether or not the cell #5 is valid. Because the cell #5 is assumed to be valid, the detector 14 generates the valid cell detection signal 103 and delivers it to the selector control signal generator 15 and FIFO write control signal generator 16.

The selector control signal generator 15 has received the back pressure signal 109 from the FIFO memory 20 before it receives the valid cell detection signal 103, i.e., during the receipt of the previous cell #4. Therefore, the selector control signal generator 15 increments its counter from "0" to "1" and feeds the selector control signals 106 and 107 representative of "1" to the selector 13 and FIFO write control signal generator 16, respectively.

In response to the selector control signal 106 representative of "1", the selector 13 selects the cell data 104 input from the shift register 11 to its input terminal (1) and delivers the data 104 to the FIFO memory 20 as the output cell data 108. In this case, because the shift register 11 holds the data of the cell #4, the selector 13 again feeds the data of the same cell #4 to the FIFO memory 20, as shown in FIG. 4E. In this manner, when the count of the counter is "1", cell data delayed by the shift register 11 by fifty-four bytes are sent to the FIFO memory 20.

The FIFO write control signal generator 16 receives the selector control signal 107 representative of the increment from "0" to "1" from the selector control signal generator 15. In addition, this control signal generator 16 has received the back pressure signal 109 during the receipt of the provision cell #4. Therefore, the control signal generator 16 generates the FIFO write control signal 110 disabling the writing of cell data and sends it to the FIFO memory 20. Consequently, although the data of the same cell #4 are again sent from the selector 13 to the FIFO memory 20, the memory 20 simply discards them due to the FIFO write control signal 110 disabling the writing of cell data. The FIFO memory 20, therefore, can stop the delivery of cell data once which would cause it to overflow. At this time, the FIFO memory 20 stops outputting the back pressure signal 109 because a part of its storage area becomes unoccupied due to the above stop of data delivery.

On the other hand, the data of the cell #5 not sent to the FIFO 20 this time are stored in the shift register 11. Because the counter of the selector control signal generator 15 maintains the count "1" even after the input of the cell #5, the data of the cell #5 are sent from the shift register 11 to the FIFO 20 when the data of the cell #6 are input. As a result, the data of the cell #5 are prevented from being lost although they are input to the FIFO 20 with a delay of fifty-four bytes. The valid cells sequentially input after the cell 190 5 are also delayed by the shift register 11 by fifty-four bytes and then sent to the FIFO memory 20 in the same manner as the cell #5.

Now, assume that the cell #n, FIG. 4B is input to the cell buffer circuit 10 as the input cell data 101, and that the back pressure signal 109, FIG. 4C, has been input from the FIFO memory 20 to the selector control signal generator 15 and FIFO write control signal generator 16 during the receipt of the cell #n−1. The valid cell detector 14 determines, based on the cell head signal 102, whether or not the cell #n is valid. Because the cell #n is assumed to be valid, the valid cell detector 14 generates the valid cell detection signal 103 and feeds it to the selector control signal generator 15 and FIFO write control signal generator 16.

The selector control signal generator 15 has received the back pressure signal 109 from the FIFO memory 20 during the receipt of the previous cell #n−1. Therefore, in response to the valid cell detection signal 103, the selector control signal generator 15 increments its counter from "1" to "2". As a result, the selector control signals 106 and 107 representative of "2" are fed to the selector 13 and FIFO write control signal generator 16, respectively.

In response to the above selector control signal 106, the selector 13 selects the cell data 105 input from the shift register 12 to its input terminal (2) and sends them to the FIFO memory 20 as the output cell data 108. At this stage, the shift register 12 holds the data of the cell #n−2 therein, so that the selector 13 sends the data of the cell #n−2 to the FIFO memory 20. Consequently, the data of the same cell #n−2 are again input to the FIFO memory 20, as shown in FIG. 4E. In this manner, so long as the count of the counter built in the selector control signal generator 15 is "2", cell data delayed by the shift registers 11 and 12 by 108 bytes in total are sent from the selector 13 to the FIFO memory 20.

The FIFO write control signal generator 16 receives the selector control signal 107 representative of the increment from "1" to "2" from the selector control signal generator 15. In addition, this control signal generator 16 has received the back pressure signal 109 during the receipt of the previous cell #n−1. Therefore, the control signal generator 16 generates the FIFO write control signal 110 disabling the writing of cell data and sends it to the FIFO memory 20. Consequently, although the data of the same cell #n−2 are again sent from the selector 13 to the FIFO memory 20, the memory 20 simply discards them due to the control signal 110 disabling the writing of cell data. The FIFO memory 20, therefore, can stop the delivery of cell data once, which would cause it to overflow. At this time, the FIFO memory 20 stops outputting the back pressure signal 109 because a part of its storage area becomes unoccupied due to the above stop of data delivery.

On the other hand, the data of the cell #n−1 stored in the shift register 11, but not sent to the FIFO 20 this time, and the data of the cell #n input this time are written to the shift registers 12 and 11, respectively. Because the counter of the selector control signal generator 15 maintains the count "2" even after the input of the cell #n, the data of the cells #n−1 and #n are sequentially sent to the FIFO memory 20 when the cells #n+1 and #n+2, respectively, are input. Therefore, the data of the cells #n−1 and #n are not lost although they are sent to the FIFO memory 20 with a delay of 108 bytes each.

Assume that the data of the invalid cell #n+3 are input to the cell buffer circuit 10 as in the input cell data 101. Then, the valid cell detector determines, based on the cell head signal 102, that the data of the cell #n+3 are invalid, and therefore does not generate the valid cell detection signal 103. The selector control signal generator 15 also determines, due to the absence of the valid cell detection signal 103, that the cell #n+3 is invalid. Because the current count of the counter is "2", the selector control signal generator 15 decrements its counter from "2" to "1" when the cell #n+5 after next is input. As a result, the selector control signals 106 and 107 representative of "2" are respectively fed to the selector 13 and FIFO write control signal generator 16 as in the case with the cell #n+2.

On receiving the selector control signal 106 representative of "2", the selector 13 selects the cell data 105 input from the shift register 12 to its input terminal (2) and sends them to the FIFO memory 20 as the output cell data 108. In this case, the data of the cell #n+1 stored in the shift register 12 are sent to the FIFO memory 20.

The FIFO write control signal generator 16 receives the selector control signal 107 representative of "2", but does not receive the valid cell detection signal 103 from the valid cell detector 14. The control signal generator 16 therefore determines that the cell #n+3 is invalid, generates the FIFO write control signal signal 110 enabling the writing of cell data, and sends the signal 110 to the FIFO memory 20. While receiving the control signal 110 enabling the writing of cell data, the FIFO memory 20 takes in the data of the cell #n+1 delayed by 108 bytes and output from the selector 13 as the output data 108.

On the other hand, the data of the cell #n+3 (invalid cell) input this time are written to the shift register 11. However, the cell #n+3 stored in the shift register 12 is discarded because the selector control signal generator 15 decrements its counter from "2" to "1" when the cell #n+5 is input, as stated earlier. In addition, the decrement of the count from "2" to "1" restores the condition wherein the delivery of cell data can be interrupted once in response to the back pressure signal 109 without the cell data being lost.

Assume that the data of the cell #n+5 are input as the input cell data 101. Then, the valid cell detector 14 determines, based on the cell head signal 102, whether or not the cell #n+5 is valid. Because the cell #n+5 is assumed to be invalid, the valid cell detector 14 does not output the valid cell detection signal 103. The selector control signal generator 15 determines, due to the absence of the signal 103, that the cell #n+5 is invalid. Because the count of the counter built in the selector control signal generator 15 is "1", the generator 15 decrements the counter from "1" to "0" when the next cell (cell #n+6) is received. Consequently, the selector control signals 106 and 107 representative of "1" are fed from the selector control signal generator 15 to the selector 13 and FIFO write control circuit 16, respectively.

In response to the selector control signal 106 representative of "1", the selector 13 selects the cell data 104 input from the shift register 11 to its input terminal (1) and delivers them to the FIFO memory 20 as the output cell data 108. Specifically, the data of the cell #n+4 stored in the shift register 11 are sent to the FIFO memory 20.

The FIFO write control signal generator 16 receives the selector control signal 107 representative of "1", but does not receive the valid cell detection signal 103 from the valid cell detector 14. Therefore, the control signal generator 16 determines that the cell #n+5 is invalid, generates the FIFO write control signal signal 110 enabling the writing of cell data, and feeds the signal 110 to the FIFO 20. While receiving the enable signal 110, the FIFO memory 20 takes in the data of the cell #n+4 output from the selector 13 as the output cell data 108.

On the other hand, the data of the cell #n+5 (invalid cell) input this time are written to the shift register 11. However, the cell #n+5 stored in the shift register 11 is discarded because the selector control signal generator 15 decrements its counter from "1" to "0" when the next cell #n+6 is input, as stated previously. In addition, the decrement of the count from "1" to "0" sets up a condition wherein the delivery of cell data can be interrupted twice in response to the back pressure signal 109 without the cell data being lost.

Assume that the data of the cell #n+7 are input as the input cell data 101. Then, the valid cell detector 14 determines, based on the cell head signal 102, whether or not the cell #n+7 is valid. Because the cell #n+7 is assumed to be invalid, the valid cell detector 14 does not output the valid cell detection signal 103. The selector control signal generator 15 determines, due to the absence of the signal 103, that the cell #n+7 is invalid. Because the count of the counter built in the selector control signal generator 15 is "0", i.e., neither "1" or "2", the generator 15 feeds the selector control signals 106 and 107 representative of "0" to the selector 13 and FIFO write control circuit 16, respectively.

In response to the selector control signal 106 representative of "0", the selector 13 selects the data of the cell #n+7 input to its input terminal (0) as the input cell data 101 and sends them to the FIFO memory 20. The FIFO write control signal generator 16 also receives the selector control signal 107 representative of "0", but does not receive the valid cell detection signal 103 from the valid cell detector 14. Therefore, the control signal generator 16 determines that the cell #n+7 is invalid, generates the FIFO write control signal 110 disabling the writing of cell data, and sends the signal 110 to the FIFO memory 20. In response to the control signal 110, the FIFO memory 20 does not take in the data of the cell #n+7 (invalid cell) fed from the selector 13. Consequently, the data of the invalid cell #n+7 are simply discarded.

As stated above, in the illustrative embodiment, input cell data are stored in the shift registers 11 and 12. When the FIFO memory 20 outputs the back pressure signal 109 for inhibiting the writing of cell data, the delivery of the cell data is interrupted. When the FIFO memory 20 stops outputting the back pressure signal 109, the cell data stored in the shift register 11 or 12 are sent to the FIFO memory 20. It follows that cell data can be sent to the FIFO memory 20 without being lost despite the back pressure signal 109.

If the above embodiment is implemented by an FPGA or a PLD, then additional shift registers can be easily arranged in the cell buffer circuit 10, as needed. This allows the depth of the FIFO memory 20 to be increased without resorting to any extra FIFO memory or device.

While the illustrative embodiment includes two shift registers 11 and 12, it may include only one shift register or three or more shift registers in consideration of, e.g., the frequency of input of an invalid cell and the frequency of occurrence of overflow. This can be done only if the number of input terminals of the selector 13 is increased in accordance with the number of shift registers.

The entire disclosure of Japanese patent application No. 322881/1997 filed on Nov. 25, 1997 and including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A cell buffer circuit comprising:

a cell data shifting section comprising a series connection of shift registers for sequentially shifting input cell data having a preselected length, said shift registers each delaying said input cell data by an amount corresponding to said preselected length;

a selector for selecting either the input cell data or cell data output from any one of said shift registers on a cell data basis; and a controller for controlling said selector such that said selector stops, on receiving a back pressure signal when selecting the input cell data, delivery of cell data once and selects cell data output from a first one of said shift registers thereafter, such that said selector selects, on receiving said back pressure signal when selecting cell data output from an nth one of said shift registers, stops delivery of cell data once and selects cell data output from an n+1th one of said shift registers thereafter, such that said selector stops, if the input cell data being selected by said selector are invalid, outputting the invalid cell data, and such that said selector selects, on receiving invalid input cell data when selecting the cell data output from said nth shift register, cell data output from an n−1th one of said shift registers after said invalid input cell data have been transferred to said nth shift register.

2. A cell buffer circuit in accordance with claim 1, wherein said controller outputs a write control signal disabling a writing of cell data to stop delivery of cell data.

3. A cell buffer circuit comprising:

a cell data shifting section comprising a shift register for shifting input cell data having a preselected length to thereby delay said input cell data by an amount corresponding to said preselected length;

a selector for selecting either the input cell data or cell data output from said shift register on a cell data basis; and a controller for controlling said selector such that said selector stops, on receiving a back pressure signal when selecting the input cell data, delivery of cell data once and selects cell data output from said shift register thereafter, such that said selector stops, if the input cell data being selected by said selector are invalid, outputting the invalid cell data, and such that said selector selects, on receiving invalid input cell data when selecting the cell data output from said shift register, input cell data after said invalid input cell data have been transferred to said shift register.

4. A cell buffer circuit in accordance with claim 3, wherein said controller outputs a write control signal disabling a writing of cell data to stop delivery of cell data.

5. A cell buffer circuit, comprising:

a cell data shifting section comprising a series connection of shift registers for sequentially shifting input cell data having a preselected length, said shift registers each delaying said input cell data by an amount corresponding to said preselected length;

a selector control signal generator including a counter whose initial count is "0" and incrementing, on receiving a back pressure signal, said count at a head of next input cell data or decrementing, if said count is n when invalid input cell data are input, said count at a head of nth input cell data as counted from said invalid input cell data, while outputting a selector control signal representative of a current count of said counter;

a selector for selecting the input cell data when said selector control signal is representative of the count "0" or selecting, when said selector control signal is representative of a count n, cell data output from an nth one of said shift registers; and a write control signal generator for generating a write control signal for inhibiting writing of one cell of data output from said selector on receiving invalid input cell data when the count represented by said selector control signal is incremented or when said count is "0".

* * * * *